(12) United States Patent
Newman

(10) Patent No.: US 6,460,239 B2
(45) Date of Patent: Oct. 8, 2002

(54) MAGNET CARRYING INSERT AND METHOD OF INCORPORATING SAME

(75) Inventor: David P. Newman, Arvada, CO (US)

(73) Assignee: Camax Tool Company, Inc., Fort Morgan, CO (US)

( * ) Notice: Subject to any disclaimer, the term of this patent is extended or adjusted under 35 U.S.C. 154(b) by 0 days.

(21) Appl. No.: 09/808,824

(22) Filed: Mar. 15, 2001

(65) Prior Publication Data

US 2001/0010115 A1 Aug. 2, 2001

Related U.S. Application Data

(63) Continuation of application No. 09/382,880, filed on Aug. 25, 1999, now abandoned.

(51) Int. Cl.$^7$ .......................... B23P 19/04; G01R 19/00
(52) U.S. Cl. ..................... 29/460; 29/406; 280/14.22; 324/67
(58) Field of Search .................. 29/406, 458, 428, 29/460, 432; 324/67, 226; 116/204, 209; 280/14.22; 411/187

(56) References Cited

U.S. PATENT DOCUMENTS

| | | | | |
|---|---|---|---|---|
| 3,448,280 A | * | 6/1969 | Blitchington et al. | ......... 29/406 |
| 3,722,360 A | * | 3/1973 | Blakey et al. | ................ 324/67 |
| 4,388,890 A | * | 6/1983 | Webster et al. | ............. 116/204 |
| 5,049,151 A | * | 9/1991 | Durham et al. | ................ 606/98 |
| 5,415,502 A | * | 5/1995 | Dahlin | ...................... 408/72 B |
| 5,432,434 A | * | 7/1995 | Tugwell | ....................... 324/67 |
| 5,532,598 A | * | 7/1996 | Clark et al. | .................... 324/67 |
| 5,554,933 A | * | 9/1996 | Logue | ......................... 324/233 |
| 5,595,563 A | * | 1/1997 | Moisdon | ..................... 600/12 |
| 5,673,927 A | * | 10/1997 | Vermillion | ................... 411/180 |
| 6,042,126 A | * | 3/2000 | Muller et al. | ............ 280/14.22 |
| 6,074,394 A | * | 6/2000 | Krause | ......................... 606/86 |

* cited by examiner

Primary Examiner—S. Thomas Hughes
Assistant Examiner—Marc Jimenez
(74) Attorney, Agent, or Firm—Joseph G. Nauman

(57) ABSTRACT

A novel insert assembly for use in snowboards and other sporting equipment provides for embedded insert location, regardless of the properties of the insert material per se, and without requiring either expensive equipment or a complex location process. This is achieved by positioning a small inexpensive magnet on or within the insert cavity, or placing a plug-like magnet in the open threaded end of the inserts. After the board assembly is complete, a magnetic material such as iron powder is dusted on the surface of the board to react with the field lines created about each insert, revealing the insert location. Then, the board can be drilled to pierce the insert cap, and facilitate removal of any plug in the insert. It is also possible to provide, through powdered metal technology, an insert material which itself will produce the desired magnetic field of sufficient intensity at the dusted surface of the board.

2 Claims, 1 Drawing Sheet

MAGNET CARRYING INSERT AND METHOD OF INCORPORATING SAME

RELATED APPLICATION

This application is a Continuation of U.S. application Ser. No. 09/382,880 filed Aug. 25, 1999, now abandoned.

BACKGROUND OF THE INVENTION

The present invention relates to threaded inserts used as attachment points in many applications, but particularly in sports equipment such a snowboards, sailboards, and certain surfboards. These inserts are typically a short cylindrical internally threaded plug, often with an integral base plate of somewhat larger diameter, embedded within the structure of the relatively thin board and serving as internally threaded anchors, accessible from a surface of the finished board, to which the bindings for the user's feet are attached. Although sixteen threaded inserts are commonly used per board in a typical snowboard, as many as thirty-two may be used, to provide size and spacing accommodation.

Specifically with respect to snowboard use, there are several common difficulties encountered with products presently available in manufacturing. These difficulties relate to ease of assembly and cost. The boards are generally constructed of a core (usually wood) of appropriate shape, into which the attachment inserts are fitted. A finish layer or laminate is applied to the outer surfaces (e.g. top and bottom) of the core and the whole assembly is cured, for example in a heated press. The outer surface at this point usually contains coloring, decoration, etc., which covers and conceals the internally contained inserts. Thus, various visual marking schemes for revealing insert location are not readily compatible with the over all manufacturing process.

Typically, in this manufacturing sequence counterbored holes or insert cavities are formed in the core material (usually wood) by a step drill. The inserts are positioned in these holes and the top and bottom of the core material, covered with the completing exterior layers or laminates of the snowboard, and the included inserts, are then simultaneously bonded into a single assembly with a thermosetting resin cured under pressure. In order to prevent resin from infiltrating the threaded cavity of the inserts, the inserts are provided with a cap or plug to be subsequently removed, for example drilled out, to exposed the threaded sockets afforded by the inserts after resin cure.

Difficulties arise in locating the embedded inserts in the final snowboard assembly in order to drill out such caps or plugs. If the board has been manufactured in a fully numerically controlled manner with suitable geometric locating features and corresponding jigs and equipment, insert location can be determined mathematically. This method, while potentially accurate is inherently expensive to establish.

What is needed is a simple, inexpensive solution to the problem of embedded insert location for cap drilling that simplifies manufacturing without compromising the manufacturability and cost of inserts.

SUMMARY OF THE INVENTION

A more accessible approach is provided by this invention using temporary formation of visible magnetic field lines. If the inserts are themselves made of a material which is capable of concentrating magnetic lines of force, a magnet can be positioned beneath the board and fine iron powder sprinkled on the top of the board, above the capped or plugged inserts. The location of the inserts will then be revealed in telltale patterns formed in the iron powder by the magnetic field lines concentrated about the inserts. While this method can serve the needs of a manufacturer, it requires that the manufacturer possess equipment to produce strong magnetic fields, and use such equipment in a separate locating step in the process. The manufacturer's choice of insert material is limited to insert materials that will concentrate a magnetic force field. Thus it is beneficial that the insert assembly itself have the capability to create a force field, and this can be accomplished with a permanent magnet associated with the insert in some manner.

Thus the present invention provides a novel insert assembly for use in snowboards and other sporting equipment that provides for embedded insert location, regardless of the properties of the insert material per se, and without requiring either expensive equipment or a complex location process.

The objects of the invention are achieved by positioning a small inexpensive magnet on or within the insert itself, as by use of a small permanent magnet attached to the cap, or by use of a magnetic cap to cover the insert cavity, or placing a plug-like magnet in the open threaded end of the inserts. After the board assembly is complete, a magnetic material such as iron powder is dusted on the surface of the board to react with the field lines created about each insert, revealing the insert location. Then, the board can be drilled to pierce the insert cap, and facilitate removal of any plug in the insert. It is also possible to provide, through powdered metal technology, an insert material which itself will produce the desired magnetic field of sufficient intensity at the dusted surface of the board.

Other objects and advantages of the invention will be apparent from the following description, the accompanying drawings, and the appended claims.

DESCRIPTION OF THE PREFERRED EMBODIMENT

Figure 1:
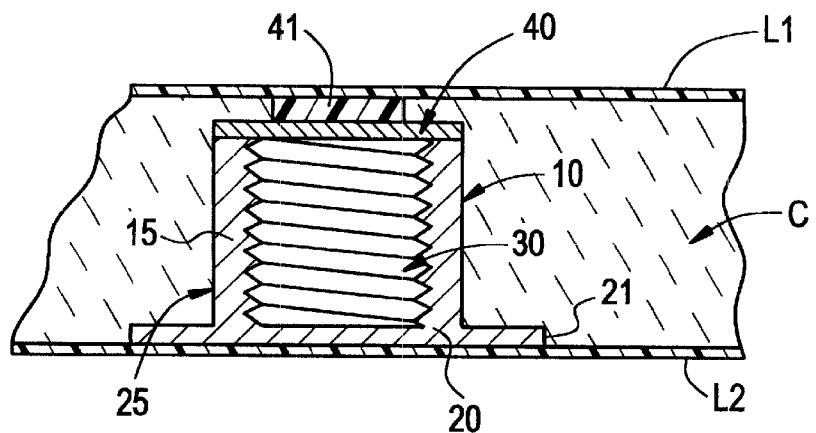
FIG. 1 shows a cross section of a segment of a board including the basic form of an insert with cap which is still in place, the material of the insert having magnetic properties sufficient to create a magnetic force field about the insert and the cavity in which it is placed.

FIG. 1 illustrates an insert 10 according to the invention, having a conventional shape including a cylindrical body 15 with an integral plate 20 at one end and with a cap 40 of generally flat geometry secured over the open end of threaded cavity 30 in the insert. Both dead end and through hole cavities are used in this art. A dead end cavity (as In FIGS. 1–3) is preferred since it will protect against use of an attachment screw which is too long, and might be driven through the bottom of the insert so as to damage the undersurface of the board.

Initially the cap is held in place on the insert by a suitable bonding agent. For example, a typical cap material is made of a polymeric material with a self-adhesive layer which holds the cap as the insert, covering cavity 30. Plate 20 may have one or more flats about its perimeter 21 which prevent spinning of the insert within the core material once the insert is bonded in place. The plate also provides a greater surface area for contact with the insert cavity in core C.

The boards are generally constructed of a core C (usually wood) of appropriate shape, into which the attachment inserts 10 are fitted. A finish layer or laminate L1 and L2 is applied to the outer surfaces (e.g. top and bottom) of core C using a suitable heat curable resin material and the whole assembly is cured, for example in a heated press. The outer surface of the assembled core and laminates at this point usually incorporates the ultimate coloring, decoration, etc., which covers and conceals the internally contained inserts. Thus, various visual marking schemes for revealing insert location are not readily compatible with the over all manufacturing process.

In the manufacturing sequence counter-bored holes or insert cavities 25 are formed in the core material C by a step drill (not shown). The inserts 10 are positioned in these holes and the top and bottom of the core material, covered with the completing exterior layers or laminates of the snowboard and the included inserts, are then simultaneously bonded into a single assembly with a thermosetting resin cured under pressure. In order to prevent resin from infiltrating the threaded cavity 30 of the inserts, the inserts are provided with a cap 40 either formed of a permanent magnet material or having a small permanent magnet 41 adhered to its top surface. This cap and/or magnet is to be subsequently removed, for example drilled out, to expose the internal threaded sockets afforded by the inserts after the resin is cured.

It is preferred that the magnet be as close as possible to the undersurface of the external cured resin coating. This produces the best locating pattern during the step of locating the inserts and removing the caps to expose the threaded insert cavities. In actual practice, the pressure bonding step will cause the magnet 41 to push the central area of cap 40 slightly into, and partially plugging, cavity 25. For clarity of illustration this ultimate position of the cap is not shown in FIG. 1.

Figure 2:
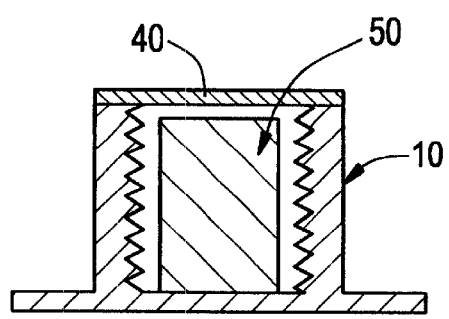
FIG. 2 shows a cross section of an insert alone, with an internal magnet according to the present invention.

FIG. 2 shows another form of the invention wherein an insert 10 has a small cylindrical magnet plug 50 positioned within the threaded cavity of the insert, covered by a non-magnetic cap 40. Preferably plug 50 is loosely fitted in place so it is simply retained in the cavity during the assembly and bonding steps.

Figure 3:
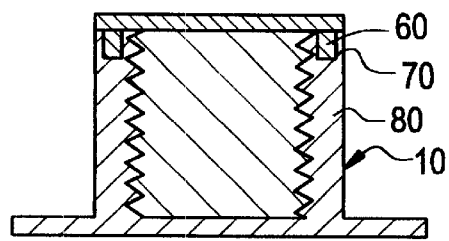
FIG. 3 shows a cross section of an insert alone, with an embedded magnetic plug according to the present invention.

FIG. 3 shows another form of an insert 10 according to the present invention with an annular or ring magnet 60 positioned in a recess 70 in the barrel 80 of the insert, covered with a conventional non-magnetic cap 40.

The invention also encompasses the provision of inserts which are themselves made of a magnetizable material. For example, the inserts can be made by moldings of powdered metal which contains a magnetizable component. A preferred material for the inserts is a high density 17-4 (ph) stainless steel which is formed using known powdered metal molding techniques to produce a corrosion resistant insert in its ultimate shape, with a tensile strength twice the strength of 300 or 400 series stainless steel, and with a textured outer surface that is particularly suited to resin wetting and bonding in the curing step of making the boards.

A suitable quantity of permanent magnet particles can be mixed with the powdered metal material prior to molding.

Each of the embodiments provides the desired magnetic force field in the region of the cap, and acting through the laminate L1. The threads are formed by a rolling process, thus contributing to increased thread strength. This strength of the insert material also contributes to self-centering of the cap or plug removal tools ( e.g. bits) to minimize damage to the finished board adjacent to the final hole providing access to the insert socket and threads.

When small particle (e.g. iron filings or powder) ferrous material is dusted over the laminate L1, distinctive circular patterns appear over the "open" ends of the inserts. The laminate, magnet, and cap are then drilled out at the location of such patterns to remove the material from over the internally threaded cavity 30. The result is a board with exposed but internally contained inserts providing anchors for a variety of bindings or other attachments to the board.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A process of constructing a board intended for sport purposes, wherein a plurality of anchors are embedded in the board, comprising the steps of:

a) providing an elongated relatively thin core member having a top and bottom and having a length and width generally corresponding to the desired dimensions of the board, b) forming a plurality of holes through said board in a predetermined pattern, said holes being counterbored from the bottom of said core member, c) placing in the holes anchor inserts comprising a cylindrical body with an open end and an integral plate fitted into the counterbores, said bodies including internally threaded cavities within the open ends, the improvement comprising:

d) placing permanent magnets in the vicinity of said open ends of each insert to create a magnetic force field in the vicinity of said open ends of said cavities, e) attaching laminates to the top and bottom of the core to cover the entire surfaces thereof and provide a finished board within which the inserts are concealed by the laminates, f) dusting a powder of particulate ferrous material over the top surface of the board, whereby the magnetic force fields attract the particulate material into concentrations overlying the location of the open ends of said inserts, h) then drilling at the concentrations of selected ones of particulate material through the top laminate to access desired ones of the threaded cavities in the underlying inserts from the top of the finished board.

2. A process of constructing a board intended for sport purposes, wherein a plurality of anchors are embedded in the board and accessible but invisible from the upper surface of the board, to provide attachment locations bindings, comprising the steps of:

a) providing an elongated relatively thin core member having a top and bottom having a length and width generally corresponding to the desired dimensions of the board, b) forming a plurality of holes through said board at potential anchor locations, said holes being counterbored from the bottom, c) placing in the holes anchor inserts comprising a cylindrical body with an open end and an integral plate fitted into the counterbores, said bodies including internally threaded cavities within the open ends, d) placing caps over said open ends of said inserts to protect the threads of the cavities, the improvement comprising:

e) providing at each insert a means to focus a magnetic force field in the vicinity of said caps, f) attaching laminates to the top and bottom of the core to cover the entire surfaces thereof and provide a finished board within which the inserts are concealed by the laminates, the top laminate being of a material which does not interfere with the magnetic force fields, g) dusting iron powder onto the exterior of the top laminate, whereby the magnetic force fields attract the powder into concentrations overlying the location of the caps, h) then drilling through the top laminate at selected ones of the iron powder concentrations to access selected ones of the threaded cavities from the top of the finished board.

* * * * *